July 27, 1954     E. C. HORTON     2,684,632
WINDSHIELD WASHER PUMP
Filed Jan. 14, 1950
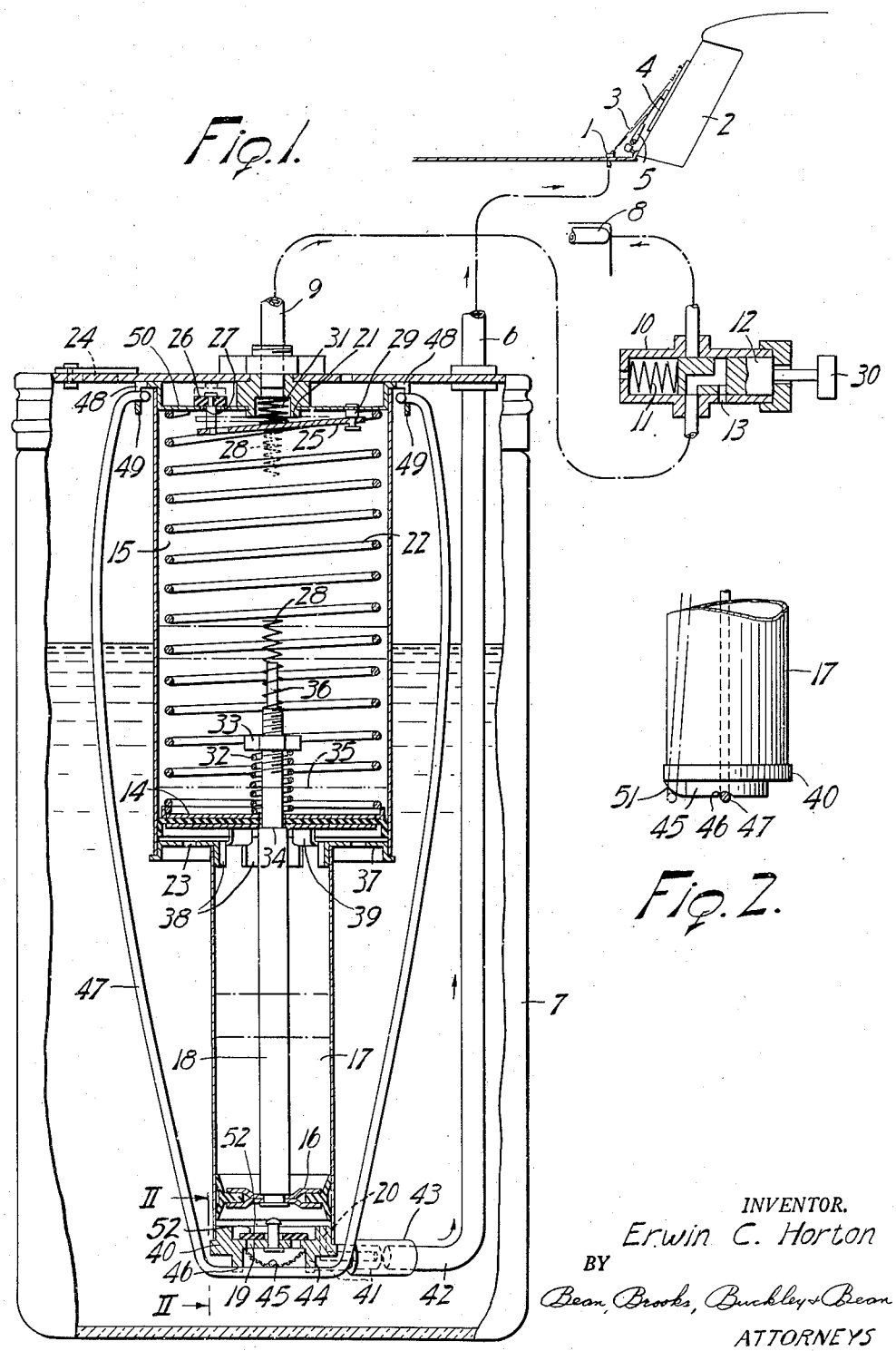
INVENTOR.
Erwin C. Horton
BY
Bean, Brooks, Buckley & Bean
ATTORNEYS Patented July 27, 1954

2,684,632

UNITED STATES PATENT OFFICE 2,684,632

WINDSHIELD WASHER PUMP

Erwin C. Horton, Hamburg, N. Y., assignor to Trico Products Corporation, Buffalo, N. Y.

Application January 14, 1950, Serial No. 138,688

9 Claims. (Cl. 103—50)

This invention relates to the windshield cleaning field and especially to a motor vehicle accessory for washing the windshield clean of vision-obscuring matter.

Devices or accessories now appearing on the market utilize a suction operated pump that is connected to the intake manifold as a source of operating pressure supply and is employed to deliver a liquid solvent through a nozzle adjacent the windshield for spraying the latter within the path usually traversed by the oscillating windshield wiping blade. Ordinarily the liquid solvent is plain water, to which may be added an anti-freeze component for winter use. Frequently, the liquid solvent is subject to freezing and in freezing exerts an expansive pressure which is likely to injure the pump mechanism and rupture the reservoir and the connecting fluid passages.

The primary object of the present invention is to provide a windshield washing system which incorporates a safety factor to protect the system against injury by the freezing action of the liquid solvent. More specially the invention aims to incorporate a flexibility of construction which will yield to permit the expansion of the freezing solvent but without interference to the efficient performance of the system when the frozen solvent again becomes fluent.

A further object of the present invention is to provide an improved construction for the pump unit which is simplified and of more economical construction.

The above and other objects of the invention will manifest themselves as the following description progresses, reference being made to the accompanying drawing, wherein Fig. 1 is a diagrammatic illustration showing primarily the pump unit in longitudinal section; and Fig. 2 is a detail elevation of the lower end of the unit showing the retaining bail in section, as viewed about on line 2—2 of Fig. 1.

Referring more particularly to the drawing, the numeral 1 designates a spray nozzle mounted on the cowl of the motor vehicle for directing an issuing spray 3 upwardly onto the windshield 2 within the path of the wiper 4 which latter is oscillated thereon by a power driven arm 5. Liquid solvent is delivered to the nozzle 1 through a pipe 6 from a reservoir 7 under the impetus of an interposed suction actuated pump unit which in turn is connected to the intake manifold 8 of a motor vehicle engine by a suction line, as conduit 9. A control valve 10 is arranged in the suction line to establish connection to the source of negative pressure, and when the valve is released a spring 11 returns the valving member 12 to its normal position in which the pump unit is vented to the atmosphere through a port 13, all in a manner set forth in the earlier application of Anton Rappl, Serial No. 23,778, now Patent No. 2,649,332 issued August 18, 1953.

The suction operated pump unit comprises a motor piston or fluid displacing member 14 operating in a chamber 15 and a fluid displacing member 16 operating in a chamber 17, the two pistons being connected by a rod 18. The pump chamber 17 is provided with an inlet 19 and an outlet 20, the latter leading to the nozzle connecting conduit 6. The suction line 9 opens into the motor chamber 15 through a port or seat 21 so that when the control valve 10 is open to the source of suction 8, the motor chamber 15 will be evacuated and the power piston 14 will be elevated against the power spring 22 by reason of the pressure differential between the subatmospheric pressure above the piston and the atmospheric pressure acting through ports 23 on the under side of the piston, the interior of the reservoir 7 opening to the outside atmosphere through the filling opening 24. As the motor piston 14 moves upwardly it will lift on the pump piston 16 to intake solvent from the reservoir through the inlet port 19, and when the valve 10 is released the motor chamber 15 will vent to the atmosphere through the hole 13 to permit the power spring 22 returning the motor piston 14 to its lowermost position and thereby move the pump piston 16 on its liquid expelling stroke to force the liquid out through the outlet port 20 and the pipe 6 for ejection from the nozzle 1. When the motor piston 14 approaches its upward limit of travel, it will engage a valve plate 25 and move it against the seat 21 to close off the suction line and concurrently unseat a connected venting valve 26 to open a port 27 for dissipating the vacuous condition in the motor chamber 15. This action will be insured by reason of cushioning spring 28 which carries through with the valve 25, the latter being pivotally hung at one end by a pin 29. Therefore, the delay in closing the manual valve 10 by releasing the button 30 will not delay delivery of the desired liquid spray onto the windshield. Subsequent to the release of the valve button 30 and the opening of the vent 13, the valving plate 25 will drop from its seat, under the urge of a light spring 31 if necessary, and reclose the venting port 27 to ready the pump unit for its next operation.

The normal level of the liquid solvent in the reservoir is well above the openings 23, consequently the liquid will flow back and forth through these openings into the space between the two pistons as they move back and forth. The reservoir contained body of solvent, when freezing, will expand and may do irreparable damage to the reservoir and other confining parts. In accordance with the present invention, means are provided to absorb the pressure and accommodate the freezing expansion in a manner to avoid damage to the parts. As illustrated, the power piston 14 is yieldably mounted on the piston rod 18 and is resiliently backed by a spring 32 the tension of which is adjusted by a nut 33 for holding the piston upon a shoulder 34 on the rod in normal operation. This provides a resilient mounting for the power piston which will permit the latter yielding, as indicated by the double dot and dash line 35, whenever the expansive pressure of the freezing liquid, either in the reservoir or in the chamber 17 above the pump piston, compels it. The freezing of the liquid in the reservoir will initially occur on the side and bottom walls and gradually work toward the center, exerting a pressure upon the liquid toward the center where the pump unit is located. Therefore, the developing pressure will act upon the yieldable piston. The piston will be restored to the supporting shoulder 34 when the solvent again becomes liquid. The upper end of the piston rod 18 may be reduced as at 36 to provide a support for the cushioning spring 28.

The casing construction for the pump unit is composed of readily removable sections for economy and to facilitate replacement of parts. These sections, too, are to a degree responsive to the expanding pressure of the freezing solvent. Each chamber is in the form of a length of cylindrical tube stock, and the adjacent ends of the two cylinders 15 and 17 are held in coaxial alignment by a ring-shaped head 37 which snugly fits within the larger cylinder and carries an annular series of down-turned lugs 38 to fit within the adjacent end of the smaller cylinder 17 for centering the latter with respect to the larger cylinder. Other lugs 39 may be turned in the opposite direction from between the lugs 38 to form stops for supporting the power piston 14 in its normal lowered position above the holes 23 which latter are conveniently punched in the ring-shaped head 37. The lower end of the pump cylinder 17 is closed by a removable head 40 in which the inlet and outlet ports 19 and 20 are formed, such head being conveniently molded from a plastic material and provided with a lateral nipple 41 in alignment with the inturned end 42 of the pipe 6 for connection therewith by means of a rubber sleeve 43. The under side of the head 40 is provided with a circular wall 44 about the inlet opening 19 to enclose a strainer or screen 45. The free edge of this wall is formed at diametrically opposite points with recesses 46 to provide seats for a spring wire bail or loop 47 for retaining the parts in their assembled relation. This retaining bail has upwardly extending legs pivotally engaging in openings 48 of the ears 49 extending laterally from the upper head 50 which closes the upper end of the motor chamber 15. The legs of the bail are slightly bowed to provide resilient support for the several parts of the casing to enable them separating if compelled by the freezing solvent. Thus, should the liquid beneath the piston 16 freeze the structure above may yield to prevent damage to the parts. The seat 21 projects through a central opening in the head and is peened over to secure the two parts together. This head is also provided with the vent 27 and carries the valve pin 29.

The parts of the pump unit are very readily assembled by centering the chamber 15 on the upper head 50, placing the power spring 22 and the power piston 14 in the larger chamber, followed by the placement of the annular head 37 and the pump chamber 17 over the pump piston 16, and then seating the lower head 40, following which the retaining bail 47 is engaged in its seat 46. To facilitate this the annular wall 45 is provided with a radial approach 51 up which the cross part of the bail may freely ride. This construction simplifies and facilitates the assemblage and replacement of parts. The inlet port 19 may be closed by a valve 52, and the outlet port may also be valved, if desired, although this latter valve may be dispensed with if the outlet port is sufficiently small as compared to the inlet port.

The pump unit, being submerged to a practical extent, provides a medium which permits freezing expansion of the liquid solvent within the reservoir as well as within the pump to prevent damage to the system.

While the foregoing description has been given in detail it is without thought of limitation since the inventive principles involved are capable of assuming other physical embodiments without departing from the spirit of the invention and the scope of the appended claims.

What is claimed is:

1. In a windshield washer, a pump unit comprising a pump chamber with a self-returning fluid displacing member therein and a motor chamber with a power member therein, said power member being connected to the fluid displacing member and having a power stroke and an idle stroke, said motor chamber being provided with a pressure supply port connectible to a source of negative pressure for actuating the power member, a normally open valve for closing said port and arranged to be moved to a port closing position by said power member during its power stroke to close off the pressure supply, normally closed valve means for venting the motor chamber to the atmosphere by and upon the closing of said valve, and spring means to restore the valve and valve means to their normal positions, a control valve in communication with the pressure supply port for controlling the communication and for venting the motor chamber when the communication is interrupted, and resilient means yieldably holding the control valve in its chamber venting position.

2. In a windshield washer, a pump unit comprising a pump chamber with a self-returning fluid displacing member therein and a motor chamber with a power member therein, said power member being connected to the fluid displacing member and having a power stroke and an idle stroke, said motor chamber being provided with a pressure supply port connectible to a source of negative pressure for actuating the power member, a normally open valve for said port and arranged to be moved to a port closing position by said power member during its power stroke to close off the pressure supply, normally closed valve means for venting the motor chamber to the atmosphere by and upon the closing of said valve, and spring means to restore the valve and valve means to their normal positions, and a control valve in communication with the pressure supply port for controlling the pressure communication with the latter and for venting the motor chamber when the communication is interrupted.

3. In a windshield washer, a reservoir, a pump unit arranged within the liquid content of the reservoir, said pump unit comprising a pump chamber with a fluid displacing member therein and a motor chamber with a power member therein yieldably connected to the fluid displacing member, said motor chamber being provided with a pressure supply port connectible to a source of negative pressure, said motor chamber at one side of the power member being open to the liquid content of the reservoir and such yieldable connection permitting expansion of the liquid content during a freezing process.

4. A windshield washer pump unit for placement in the liquid content of a reservoir, comprising a motor chamber and a pump chamber, a fluid displacing member in the latter, a power piston member in the motor chamber, means resiliently connecting the fluid displacing member and the power piston member for movement in unison while permitting relative separating movement therebetween, and means providing open communication to the chamber space between the fluid displacing member and the power piston member to enable one of said members receiving the expansive pressure on the liquid content during freezing thereof.

5. A pump unit for windshield washers, comprising a motor cylinder with a removable head on one end and an annular head on the other end, a pump cylinder having a removable head on one end and its opposite end seating on the annular head for interchamber communication, a fluid displacing member in each cylinder, a piston rod connected to one fluid displacing member and slidably extending through the other member with means resiliently connecting the rod thereto for relative yielding movement from the companion member, supporting means for the pump unit, and passage means for connecting the motor cylinder to a source of operating pressure for acting on one side of the fluid displacing member of the motor cylinder, the opposite side of the latter member being open to the atmosphere.

6. A pump unit for windshield washers, comprising a motor cylinder with a removable head on one end and an annular head on the other end, a pump cylinder having a removable head on one end and its opposite end seating on the annular head for inter-chamber communication, a resilient retaining bail having cylinder straddling legs pivotally connected to the first head and movable to and from a position over the third head to tie the heads and cylinders together while permitting relative movement between certain of the component parts when compelled by the expansive force of a freezing liquid content of the pump cylinder, and a fluid displacing unit in the cylinder.

7. A pump unit for windshield washers, comprising a motor cylinder with a removable head on one end and an annular head on the other end, a pump cylinder having a removable head on one end and its opposite end seating on the annular head for inter-chamber communication, a resilient retaining bail having cylinder straddling legs pivotally connected to the first head and movable to and from a position over the third head to tie the heads and cylinders together while permitting relative movement between certain of the component parts when compelled by the expansive force of a freezing liquid content of the pump cylinder, a fluid displacing member in each cylinder, a piston rod connected to one fluid displacing member and slidably extending through the other member with means resiliently connecting the rod thereto for relative yielding movement from the companion member, and means for supporting the pump unit within the liquid content of a reservoir.

8. A pump unit for windshield washers, comprising a motor cylinder with a removable head on one end and an annular head on the other end, a pump cylinder having a removable head on one end and its opposite end seating on the annular head for inter-chamber communication, a removable retaining bail having cylinder straddling legs pivotally connected to the first head and movable to and from a position over the third head to tie the heads and cylinders together while permitting relative movement between certain of the component parts when compelled by the expansive force of a freezing liquid content of the pump cylinder, and a fluid displacing unit in the cylinders, said bail embodying resilient means yieldably permitting relative movement between the first and third heads.

9. A pump unit for windshield washers, comprising a motor cylinder with a removable head on one end and an annular head on the other end, a pump cylinder having a removable head on one end and its opposite end seating on the annular head for inter-chamber communication, a removable retaining bail having cylinder straddling legs pivotally connected to the first head and movable to and from a position over the third head to tie the heads and cylinders together while permitting relative movement between certain the component parts when compelled by the expansive force of a freezing liquid content of the pump cylinder, and a fluid displacing unit in the cylinders, the straddling legs of the bail being bowed to provide a resilient connection between the first and third heads permitting of relative separating movement therebetween.

References Cited in the file of this patent

UNITED STATES PATENTS

| Number | Name | Date |
|---|---|---|
| 520,349 | Zies | May 22, 1894 |
| 1,390,617 | Jay | Sept. 17, 1921 |
| 1,621,933 | Jones | Mar. 22, 1927 |
| 2,114,558 | Desmukes | Apr. 19, 1938 |
| 2,153,519 | Horton | Apr. 4, 1939 |
| 2,162,985 | West | June 20, 1939 |
| 2,433,589 | Adams | Dec. 30, 1947 |
| 2,540,290 | Rappl et al. | Feb. 6, 1951 |